(12) United States Patent
Auffret et al.

(10) Patent No.: US 11,368,576 B2
(45) Date of Patent: Jun. 21, 2022

(54) MANAGEMENT OF A COMMUNICATION CALL BETWEEN A CALLER COMMUNICATIONS TERMINAL, HAVING A MAIN CALL IDENTIFIER AND A SECONDARY CALL IDENTIFIER, AND A CALLED COMMUNICATIONS TERMINAL

(71) Applicant: ORANGE, Issy-les-Moulineaux (FR)

(72) Inventors: Jean-Marc Auffret, Chatillon (FR); Aurelien Guillou, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/674,615

(22) Filed: Nov. 5, 2019

(65) Prior Publication Data
US 2020/0145529 A1 May 7, 2020

(30) Foreign Application Priority Data
Nov. 5, 2018 (FR) ...................... 1860159

(51) Int. Cl.
*H04M 3/00* (2006.01)
*H04M 5/00* (2006.01)
(Continued)

(52) U.S. Cl.
CPC ..... *H04M 3/4217* (2013.01); *H04M 3/42042* (2013.01); *H04M 3/42059* (2013.01); *H04M 3/436* (2013.01)

(58) Field of Classification Search
CPC ........ H04M 3/436; H04M 1/57; H04M 1/663; H04M 1/72572; H04M 3/42042;
(Continued)

(56) References Cited

U.S. PATENT DOCUMENTS 6,697,461 B1 * 2/2004 Middleswarth ....... H04M 3/436
379/221.08
9,781,255 B1 * 10/2017 Gailloux ................ H04M 3/51
(Continued)

FOREIGN PATENT DOCUMENTS

EP 1396989 A2 3/2004
WO 2017060643 A1 4/2017

OTHER PUBLICATIONS

French Search Report and Written Opinion dated May 10, 2019 for corresponding French Application No. 1860159, filed Nov. 5, 2018.
(Continued)

*Primary Examiner* — Kharye Pope
(74) *Attorney, Agent, or Firm* — David D. Brush; Westman, Champlin & Koehler, P.A.

(57) ABSTRACT

A method for managing a communication call between a caller communications terminal and a called communications terminal. The caller communications terminal has a permanent main call identifier and at least one recorded temporary secondary call identifier, in association with the main call identifier, in at least one communications management device. When the caller communications terminal initiates a communication call to the called communications terminal from the secondary call identifier, such a method implements: sending, to the called terminal, a notification including at least the main call identifier, the secondary call identifier and at least one piece of identification information of a user of the calling terminal associated with said secondary call identifier; and routing the communication call to the called terminal in using the secondary call identifier.

10 Claims, 5 Drawing Sheets

(51) Int. Cl.
*H04L 12/66* (2006.01)
*H04M 3/42* (2006.01)
*H04M 3/436* (2006.01)

(58) Field of Classification Search
CPC .. H04M 1/271; H04M 2250/66; H04M 7/006; H04M 3/42059; H04L 65/1096; H04L 67/306; H04L 63/102; H04L 29/12094; H04L 29/12122; H04L 61/1529; H04L 61/1547; H04L 65/1006; H04W 4/12; H04W 4/16; H04W 68/00
USPC ............. 379/210.02, 88.19, 142.04, 142.06, 379/142.01, 211.01; 455/563, 417, 566, 455/414.1, 556.1, 410; 370/352, 252, 370/351, 356
See application file for complete search history.

(56) References Cited

U.S. PATENT DOCUMENTS

| | | | | |
|---|---|---|---|---|
| 2006/0234693 | A1* | 10/2006 | Isidore | H04M 3/436 455/422.1 |
| 2007/0105531 | A1 | 5/2007 | Schroeder, Jr. | |
| 2007/0242809 | A1* | 10/2007 | Mousseau | H04W 88/06 379/88.18 |
| 2008/0159502 | A1* | 7/2008 | Venkatesulu | H04M 1/57 379/142.06 |
| 2009/0304167 | A1* | 12/2009 | Wright | H04M 3/436 379/142.05 |
| 2010/0002685 | A1* | 1/2010 | Shaham | H04M 3/002 370/352 |
| 2011/0026468 | A1* | 2/2011 | Conrad | H04W 4/16 370/329 |
| 2011/0034156 | A1* | 2/2011 | Gatti | H04M 1/56 455/415 |
| 2013/0114511 | A1* | 5/2013 | Ma | H04W 76/10 370/328 |
| 2013/0189961 | A1* | 7/2013 | Channakeshava | H04W 4/12 455/414.1 |
| 2013/0203397 | A1* | 8/2013 | Vidal | H04M 1/677 455/418 |
| 2013/0275508 | A1* | 10/2013 | Bestmann | H04L 61/1594 709/204 |
| 2013/0282789 | A1 | 10/2013 | Langworthy et al. | |
| 2014/0324872 | A1* | 10/2014 | Lu | H04L 61/1594 707/740 |
| 2016/0100050 | A1* | 4/2016 | VanBlon | H04M 3/42042 455/415 |
| 2016/0337513 | A1* | 11/2016 | Seward | H04M 3/42348 |
| 2016/0337825 | A1* | 11/2016 | Piscopo, Jr. | H04L 65/1016 |
| 2017/0041460 | A1* | 2/2017 | Seward | H04M 1/57 |
| 2019/0007806 | A1* | 1/2019 | Chu | H04M 3/42059 |
| 2019/0068778 | A1* | 2/2019 | Ravichandran | H04L 61/157 |

OTHER PUBLICATIONS

Johnston MCI S Donovan R Sparks C Cunningham Dynamicsoft K Summers Sonus A., "Session Initiation Protocol (SIP) Basic Call Flow Examples; RFC3665.txt", Session Initiation Protocol (SIP) Basic Call Flow Examples; RFC 3665.txt, Internet Engineering Task Force, IETF; Standard, Internet Society (ISOC) 4, Rue Des Falaises Ch—1205 Geneva, Switzerland, Dec. 1, 2003 (Dec. 1, 2003), XP015009446.

European Search Report and Written Opinion dated Nov. 27, 2019 for corresponding European Application No. 19205275.

English translation of the Written Opinion dated May 10, 2019 for corresponding French Application No. 1860159, filed Nov. 5, 2018.

* cited by examiner

MANAGEMENT OF A COMMUNICATION CALL BETWEEN A CALLER COMMUNICATIONS TERMINAL, HAVING A MAIN CALL IDENTIFIER AND A SECONDARY CALL IDENTIFIER, AND A CALLED COMMUNICATIONS TERMINAL

1. FIELD OF THE INVENTION

The field of the invention is that of the management of a communication call or communication session between two communications terminals. More specifically, the invention relates to communications services enabling a user to have at his disposal several call identifiers associated with one and the same communications terminal.

2. PRIOR ART AND ITS DRAWBACKS

Certain communications services currently propose the allocation of one or more secondary call identifiers to a calling user's communications terminal that already has a main call identifier. For example, should the calling user have a mobile communications terminal, the main call identifier is an MSISDN (Mobile Station International Subscriber Directory Number) identifier that corresponds uniquely to the SIM (Subscriber Identity Module) card provided by the operator of the mobile network with which the user has registered. As a general rule, this identifier is the phone number of the mobile terminal in this mobile network, known to the public. Such services make it possible for example to guarantee the user's anonymity and are proposed to him, for example, when the calling subscriber wishes to place an advertisement on a website dedicated to this purpose, such as for example a classified ads site, a dating site, a personal or professional type of social network etc. It is then proposed to the user to benefit from a secondary call identifier that he can use to make telephone contact with anyone who has left his details on the dedicated website without having to disclose his main call identifier to this person. The calling user can also be reached on this secondary call identifier.

More generally, this possibility of having several call identifiers available for one and the same terminal has other points of interest than the simple guarantee of anonymity of the caller terminal. Indeed, the user can have several call identifiers which he can then use in different contexts. For example, he can reserve the use of his main call identifier for communications made in a professional context and use one or more secondary call identifiers for communications in his personal sphere, for example a first secondary call identifier to communicate with his family and his friends, and a second secondary call identifier reserved for his exchanges via social networks.

Such a communication service works as follows. The user who wishes to benefit from this service preliminarily registers with a platform managing this service, by providing his personal details, and especially his main call identifier. A secondary call identifier is then allotted to him and is then registered in the platform in correspondence with his main identifier. The user downloads the application dedicated to this service on his telephone. When the user wishes to set up a communication call with a called communication terminal, he sends to the communication management platform, via the application, a message containing his main call identifier and a call identifier of the user whom he wishes to call. A call, for example a voice call, is the triggered to the call identifier of the called communications terminal.

This call is intercepted by the router of the communications network which retrieves the secondary identifier of the caller terminal from the communications management platform and then sends out a call from this secondary identifier to the main call identifier of the called user's terminal. Finally, the router sets up the communication call between the caller terminal and the called terminal.

Although this service is well suited to efficiently ensuring the anonymity of the user who has subscribed thereto and to ensuring the continuity of the call, it has a certain number of drawbacks both for the called terminal and for the caller terminal.

For the user of the called terminal first of all, it can prove to be difficult to identify the sender of an incoming call if this call is made through a secondary call identifier which is by nature unstable. Even if the user of the caller terminal is a known contact recorded in the address book of the called terminal, it cannot be identified by the called user if the communication call is set up from a secondary call identity unknown to him.

This can especially prove to be a problem should the call received correspond to commercial sales pitch which the user of the called terminal considers to be a nuisance and inappropriate. In this extreme case where the user of the called terminal considers that these calls amount to spam and has taken the step of blocking the main call identifier of the caller terminal, the use of a secondary call identifier by the caller terminal enables this caller terminal to circumvent this block, and this is a nuisance for the user of the called terminal.

Similarly, when the user of the caller terminal is not specifically seeking anonymity, this situation can also prove to be source of problems. For example, when the user of the caller terminal is carrying out business prospection, there is little chance that the user of the called terminal will accept an incoming call sent out from a secondary call identifier that he or she has not pre-recorded in his or her address book, if the called terminal has not subscribed to a reverse telephone directory enabling him or her for example to identify the company or firm making the call. The professional activity of the calling user can therefore be hampered by the use of a secondary call identifier.

Similarly, in the personal sphere, the user can have difficulties in contacting his friends when he uses a secondary call identifier that these friends do not recognize as belonging to one of their known contacts.

There is therefore a need for a technique for managing communication calls that does not have these different drawbacks of the prior art. In particular, there is a need for such a technique that enables a user to benefit from the flexibility of using several call identifiers to set up communication calls while at the same time improving his chances of these calls effectively going through. There is also a need for such a technique that reduces the nuisance generated for the user of the called terminal by the use of secondary call identifiers by a caller communication terminal.

3. SUMMARY OF THE INVENTION

The invention meets this need by proposing a method for managing communication calls between a caller communications terminal and a called communications terminal, the caller communications terminal having a permanent main call identifier and at least one recorded temporary secondary call identifier in association with said main call identifier, in at least one communications management device.

According to the invention, when the caller communications terminal initiates a communication call, to the called communications terminal, from a secondary call identifier, such a method implements:
- a sending, to the called terminal, of a notification comprising at least the main call identifier, the secondary call identifier and at least one piece of identification information of a user of the caller terminal associated with the secondary call identifier;
- a routing of the communication call to the called terminal in using the secondary call identifier.

Such a communications management method is implemented in a communications management device such as a platform for managing the secondary call identifiers in a mobile communications network.

As a corollary, the present invention also relates to a method for managing an incoming communication call by means of a called communications terminal, the incoming communication call being initiated by a caller communications terminal having a permanent main call identifier and at least one recorded temporary secondary call identifier in association with the main call identifier in at least one communications management device.

According to the invention, when the incoming communication call is initiated from the secondary call identifier, the called communications terminal implements:
- a reception of a notification comprising at least the main call identifier, the secondary call identifier and at least one piece of identification information of a user of the caller terminal associated with the secondary call identifier;
- a verification of presence of the main call identifier and/or the secondary call identifier in an address book of the called communications terminal;
- upon reception of the incoming communication call:
  - in the event of the presence of the main call identifier and/or the secondary call identifier in the address book, display of a user identifier stored in the address book, in association with the present call identifier;
  - in the absence of the main call identifier and the secondary call identifier in the address book, a display of the identification information comprised in the received notification.

Thus, the invention relies on a wholly novel and inventive approach to the management of communication calls between caller terminals and called terminals when the caller terminal has a permanent main call identifier (classically its main telephone number known to the public) and one or more temporary secondary call identifiers (i.e. one or more other telephone numbers that it has acquired from the operator of its mobile communications network). Indeed, these different communications management methods according to an embodiment of the invention, respectively implemented in a communications management platform for the former and in the called communications terminal for the latter, rely on the dispatch, by the communications management platform, of a notification addressed to the called communications terminal, which contains the main call identifier of the caller terminal as well as the secondary call identifier that it uses to set up a communication call with the called terminal and a piece of information identifying the user of the caller terminal.

This piece of identification information of the user of the caller terminal can take various forms: it can be textual information such as family name/forename or company name for which the user is working, or more specifically the name of a department within this company; it can also be an image, such as the user's photograph or his company logo; it can also be a video or an animated picture, for example an advertisement for the company in which the user is working or an advertisement for one of its products; this piece of identification information can also take the form of a hyperlink that points to a website, for example a hyperlink pointing to the name of the calling user's company, or to its logo.

Thus, the dispatch of such a notification by the communications management platform to the called terminal enriches the called user's knowledge of the context of the incoming communication call so that he can decide if he must accept or reject the incoming communication call.

Indeed, on the basis of the permanent main call identifier (e.g. the MSISDN) of the caller terminal, the called terminal can verify whether the calling user corresponds to a contact that it has already recorded in its address book. If the answer is affirmative, this enables the called terminal to directly display, for the called user, the contact information recorded in the address book in association with this main telephone number, and do so although the incoming communication call is made from a temporary secondary call identifier unknown to the called user.

If the answer is negative, the called terminal can however display the identification information of calling user contained in the notification received from the communications management platform (the logo, company name etc.). The called user has thus more information on the person seeking to contact him and therefore on the context of this call. He can then make an informed decision on the acceptance or rejection of this incoming communication call.

It should be noted that, throughout this document, a main call identifier is defined as a call identifier permanently associated with a communication terminal identified in an operator's communication network. Thus, in general, such a main call identifier cannot be changed without termination of the contract with the network operator. In the case of a mobile communication network, such a main call identifier is the MSISDN call number uniquely corresponding to the SIM card.

Similarly, a secondary call identifier is defined as a call identifier temporarily associated with a communication terminal: such a temporary call identifier is generated in the operator's communication network at the request of the user of the communication terminal, for a limited (but possibly long) period. Such a secondary call identifier is, in essence, volatile.

Thus, all the call identifiers of a communication terminal in the operator's network have a tree structure, whose root is the permanent main call identifier of the terminal, and whose secondary call identifiers form as many obsolete sheets of the structure. A communication call between a caller terminal and a called terminal can then be set up from either a main call identifier or a secondary call identifier.

According to one aspect of such a communications management method implemented by a communications management device, such a notification also comprises an instruction on the management of a contact associated with the user of the caller terminal, the management instruction belonging to the group comprising:
- a creation instruction;
- a reading instruction;
- an update instruction;
- a delete instruction.

These instructions are known as CRUD (Create, Read, Update, Delete) operations. They enable the called communications terminal to manage the database associated with the user's contacts address book, for example by recording the secondary call identifier of an already known contact in association with his main call identifier, or by recording therein the pieces of identification information of the calling user contained in the notification (for example his company logo).

Indeed, as a corollary, according to one aspect of such a communications management method, in the event of the presence of the main call identifier in the address book, the called communications terminal does an update, in the address book, of a contact associated with a user of the caller terminal by adding the secondary call identifier and/or the piece of identification information contained in the notification received.

Thus, the called terminal enriches the information contained in the address book for this particular contact by recording his new telephone number and the profile information that he had wished to enter into the communications management platform.

According to another aspect, in the absence of the main call identifier and of the secondary call identifier in the address book, the method also comprises, at the end of the incoming communication call, a display by the called terminal of a message proposing the recording of the identification information, in association with the secondary call identifier and/or the main call identifier, in the address book.

Thus, the called user can easily create a new contact in his address book, in which he memorizes the different pieces of information contained in the notification received from the communications management platform (main telephone number, secondary telephone number, user profile information, etc. . . )

According to yet another aspect, such a method for managing an incoming communication call by a called terminal also comprises a verification that the main call identifier and/or the secondary call identifier is a blocked call identifier and, if the answer is affirmative, a rejection of the incoming communication call initiated from the secondary call identifier.

Thus, the performance of the anti-spam mechanisms is improved: if the called user has already blocked the main telephone number of an inappropriate calling user, he can use information contained in the notifications that he has received to directly identify the fact that the secondary telephone number used for the incoming call is associated with the same caller terminal, and can therefore directly reject the call. He can also extend the database of telephone numbers associated with spams by recording this secondary call identifier therein.

The invention also relates to a computer program product comprising program code instructions to implement a method for the management of communication calls by means of a communications management device as described here above when it is executed by a processor. It also relates to a computer program product comprising program code instructions for the implementing of a method for the management of incoming communication calls by means of a called communications terminal as described here above when it is executed by a processor.

The invention is also aimed at providing an information carrier or medium readable by a computer, on which there is recorded a computer program comprising program code instructions for the execution of the steps of one of the two communications management methods according to the invention as described here above.

Such a recording carrier can be any entity or device whatsoever capable of storing the program. For example, the carrier or medium can comprise a storage means such as a ROM, for example, a CD ROM or microelectronic circuit ROM or again a magnetic recording means, for example a USB stick or a hard disk drive.

Besides, such an information carrier can be to a transmissible carrier such as an electrical or optical signal, that can be conveyed by an electrical or optical cable, by radio or by other means so that the computer program that it contains can be executed remotely. The program according to the invention can especially be uploaded to a network, for example the Internet.

As an alternative, the recording medium can be an integrated circuit into which the program is incorporated, the circuit being adapted to executing or to being used in the execution of the display control method mentioned here above.

The invention also relates to a communications management device for setting up a communication call between a caller communications terminal and a called communications terminal. Such a communications management device comprises a processing circuit that is configured to record, in association, a permanent main call identifier and at least one temporary secondary call identifier of said caller communications terminal, and is also configured to:
  receive a communication call initiated by the caller communications terminal from the secondary call identifier, addressed to the called communications terminal;
  send out a notification to the called terminal, comprising at least the main call identifier, the secondary call identifier and at least one piece of identification information of a user of the caller terminal associated with the secondary call identifier;
  route the communication call to the called terminal in using the secondary call identifier.

Such a device is for example a service platform managing the allocation of secondary call identifiers to the subscribers of a mobile communications network such as the O-IONA® platform developed by Orange®.

The invention also relates to a communications terminal comprising a processing circuit configured to process an incoming communication call initiated by the caller communications terminal, having a permanent main call identifier and at least one recorded temporary secondary call identifier in association with the main call identifier in at least one communications management device. Such a processing circuit is also configured, when the incoming communication call is initiated from the secondary call identifier, to:
  receive a notification comprising at least the main call identifier, the secondary call identifier and at least one piece of identification information of a user of the caller terminal associated with the secondary call identifier;
  perform a verification of presence of the main call identifier and/or the secondary call identifier in an address book of the called communications terminal;
  upon reception of the incoming communication call:
    in the event of a presence of the main call identifier and/or the secondary call identifier in the address book, display a user identifier stored in the address book in association with the present call identifier;
    in the event of an absence of the main call identifier and of the secondary call identifier in the address book, display the identification information comprised in the notification received.

The communications management device, the communications terminal and the corresponding computer programs mentioned here above have at least the same advantages as those provided by the communications management methods according to the present invention.

4. LIST OF FIGURES

Other aims, characteristics and advantages of the invention shall appear more clearly from the following description, given by way of a simple, illustrative and non-exhaustive example with reference to the figures, of which:

Figure 4:
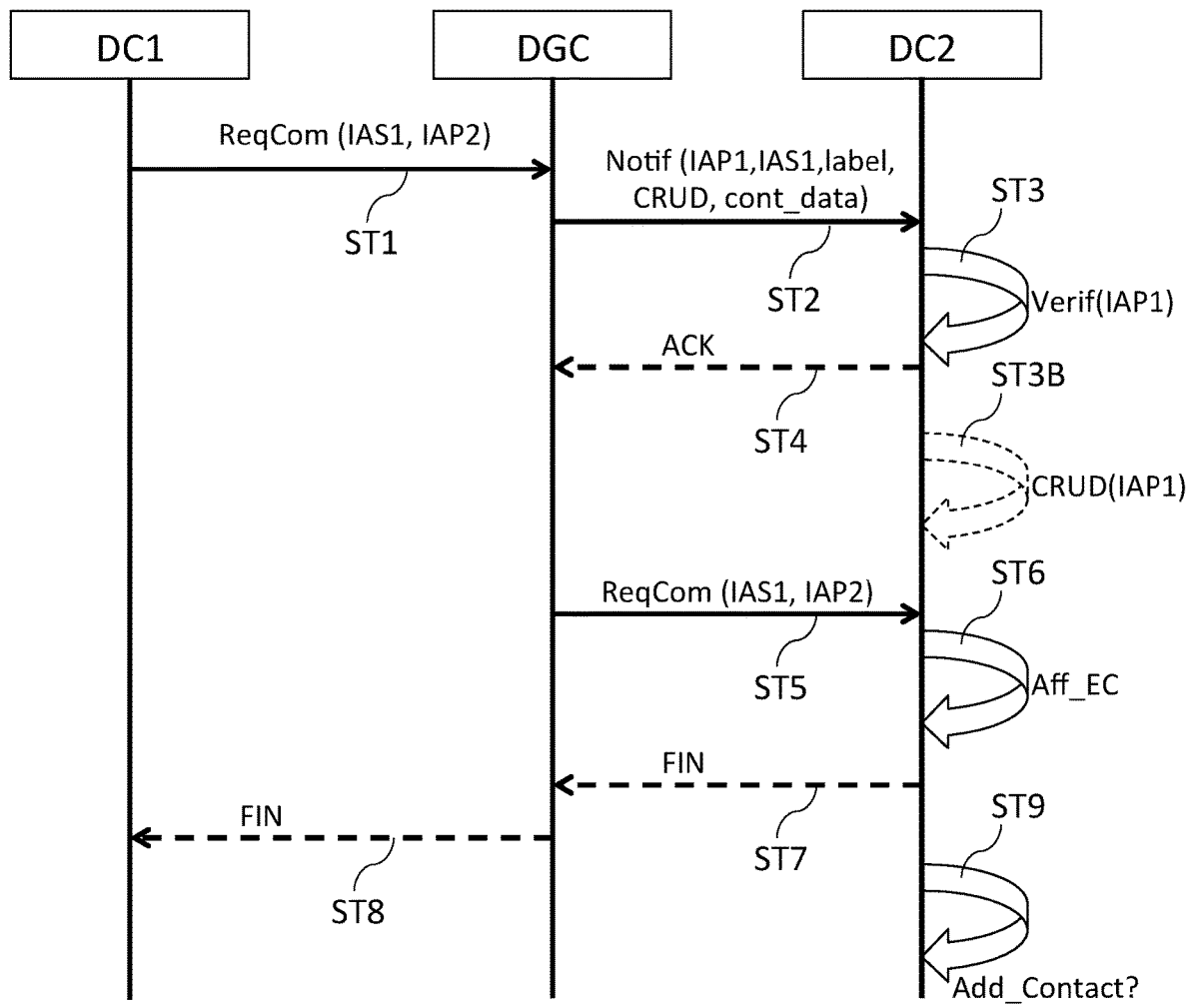
FIG. 4 shows the main steps of a method for managing communications between a caller communications terminal and a called communications terminal according to one embodiment of the invention.
Figure 5:
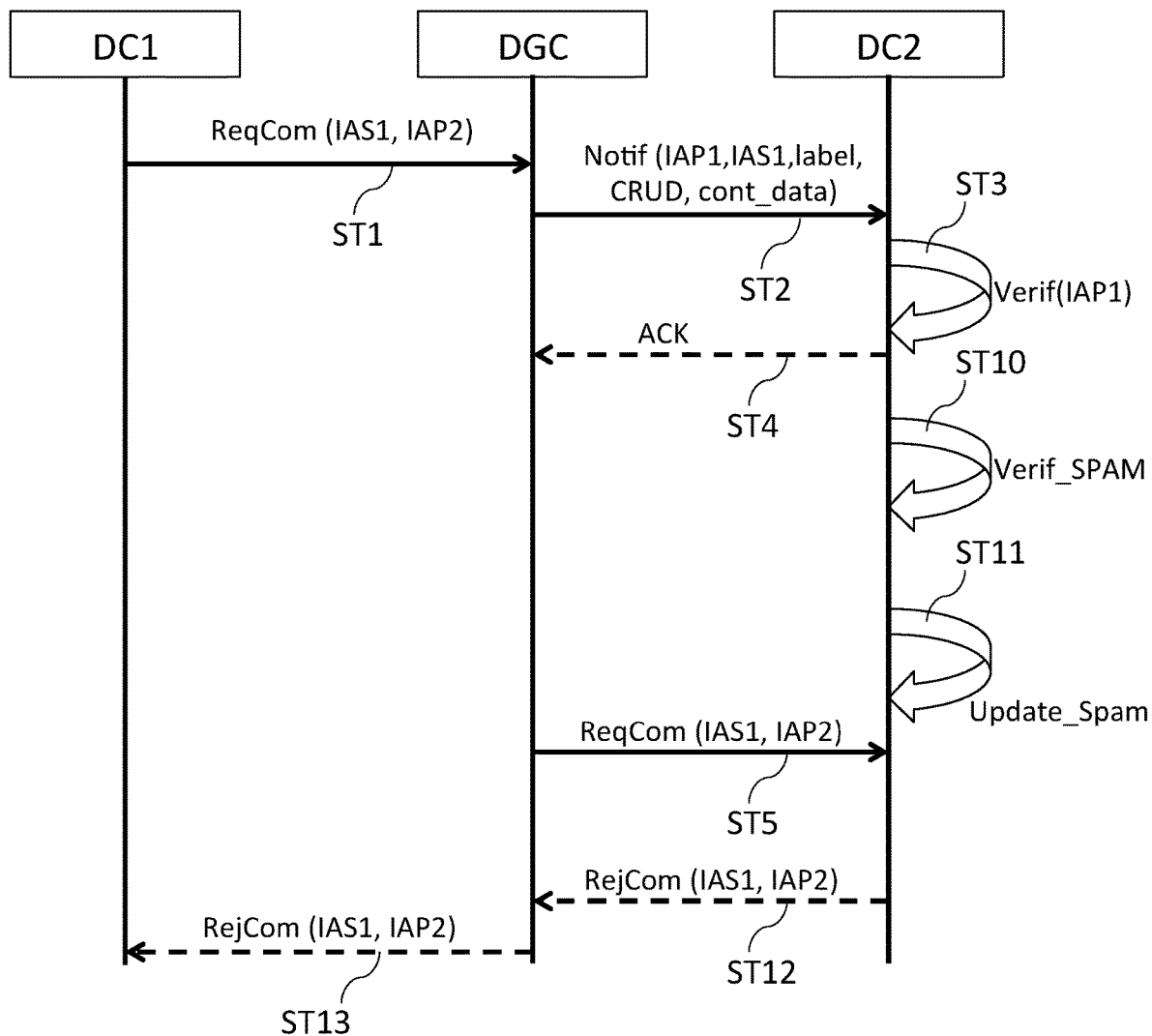

FIG. 5 presents a variant of FIG. 4 in the particular case of the management of undesirable call identifiers.

5. DETAILED DESCRIPTION OF EMBODIMENTS OF THE INVENTION

The general principle of the invention relies on the sending, by a communications management platform, of a notification prior to setting up of a communication call between a caller communications terminal and a called communications terminal comprising the permanent main call identifier of the caller terminal, its temporary secondary call identifier used to initiate the communication call and pieces of complementary identification information of the calling user. This notification is sent to the called terminal which can use its content to facilitate the identification, by the called user, of the calling user.

Figure 1:
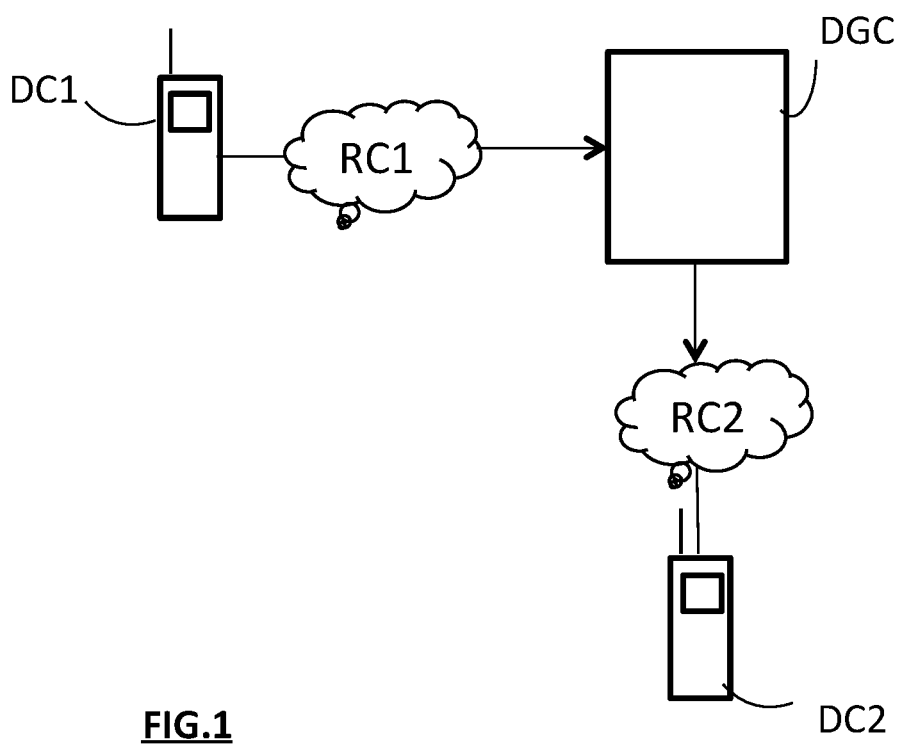
FIG. 1 is a schematic and general view of a system for setting up a communication call between a caller communications terminal and a called communications terminal according to one embodiment of the invention.

FIG. 1 schematically illustrates a system implementing the methods for managing a communication call according to one embodiment of the invention. For the sake of clarify in FIG. 1, certain well-known elements of this system are not represented. Such elements are for example servers, nodes, base stations, gateways or again other entities of the telecommunications network used in this system.

The system comprises a first communications device DC1 capable of setting up a communication call addressed to a second communications device DC2.

In the example shown, the communications device DC1 is a mobile telephone comprising a SIM card provided with a unique subscriber identity known as an IMSI (International Mobile Subscriber Identity). In a manner known per se, this identifier is used to identify the communications device DC1 in the communications network RC1 to which it belongs, i.e. the network to which the user UT1 of the communications device DC1 has subscribed. In the example shown, the network RC1 is a mobile type, for example a GSM (Global System for Mobile Communications) network or UMTS (Universal Mobile Telecommunications System) or LTE (Long Term Evolution) system. The IMSI identifier is associated with a main call identifier MSISDN, denoted as IAP1, which is a "physical" telephone number, in the sense that it is the telephone number associated with the SIM card that can be used to contact the communications device DC1. Thus, the main call identifier IAP1 cannot be changed unless the contract with the telephone operator is cancelled and another SIM card is obtained. In other words, the main call identifier is a permanent identifier attached to the communication device DC1 in the network RC1.

This example is of course not exhaustive. Thus, according to another example, the communications device DC1 is for example a landline telephone that is part of a Private Automatic Branch Exchange (PABX).

Depending on the type of communications network RC1, the main call identifier IAP1 of the communications device DC1 could be different from a telephone number. For example, it could consist of metadata associated with the user UT1 of the communications device DC1, such as in particular an image or information on the user such as his name and address.

In the embodiment of FIG. 1, the first communication device DC1 also has one or more secondary call identifiers IAS1 which are additional telephone numbers used to contact the communications device and initiate communication calls to other communication devices.

The secondary call identifier IAS1 is a so-called "virtual" call number, i.e. one that has a limited lifetime depending on the needs of the user UT1, because it is generated in the call network (in particular via IMS/SIP platforms) and at the user's request. In one example, the user UT1 only needs this secondary call identifier IAS1 for one day, one week or one month. In other words, one can very well use such a secondary call identifier IAS1, or "secondary number", to call family members, i.e. for private purposes, and a different secondary call identifier for professional activities.

All "secondary numbers" are linked to the main number, or main call identifier IAP1, in particular through a Database Management System (DBMS) in the IMS/SIP network for example, to be able to manage call identity across all "secondary numbers" and thus know who owns which "secondary number". In other words, the secondary call identifier IAS1 is an additional call identifier associated with the main call identifier IAP1 and is of a volatile nature.

The second communications device DC2 is capable of receiving the communication call initiated by the communications device DC1. In the same way as in the case of the communications device DC1, the communication device DC2 is also provided with a main call identifier IAP2. In the example shown, the communications device DC2 is a mobile phone belonging to a mobile type of communications network RC2. However, the communications device DC2 can also be landline telephone belonging to a switched telecommunications network or else again a communication server such as for example an emergency call reception server. The second communication device DC2 may or may not also have one or more secondary call identifiers IAS2.

According to another example not shown, the communications networks RC1 and RC2 can form single communications network of a same telecommunications operator.

In addition, in the present description, the term "communication call" is understood to mean a classic voice call or any other communications session whatsoever of a data and/or audio and/or video type initiated by the communications device DC1 and addressed to the communications device DC2.

The system shown in FIG. 1 additionally comprises a communications management device DGC. Such a device is a platform installed in a network intended for:

managing the allocation of secondary call identifiers to the communications devices that request it. In this respect, the device DGC maintains, for example, a database in which it records, in association, the main identifier IAP and one or more secondary call identifiers IAS (for example for the communications device DC1, a pair (IAP1, IAS1));

process all communication calls initiated by the communications device DC1 from one of its secondary call identifiers, intended for the main call identifier IAP2 of the communications device DC2.

Figure 2:
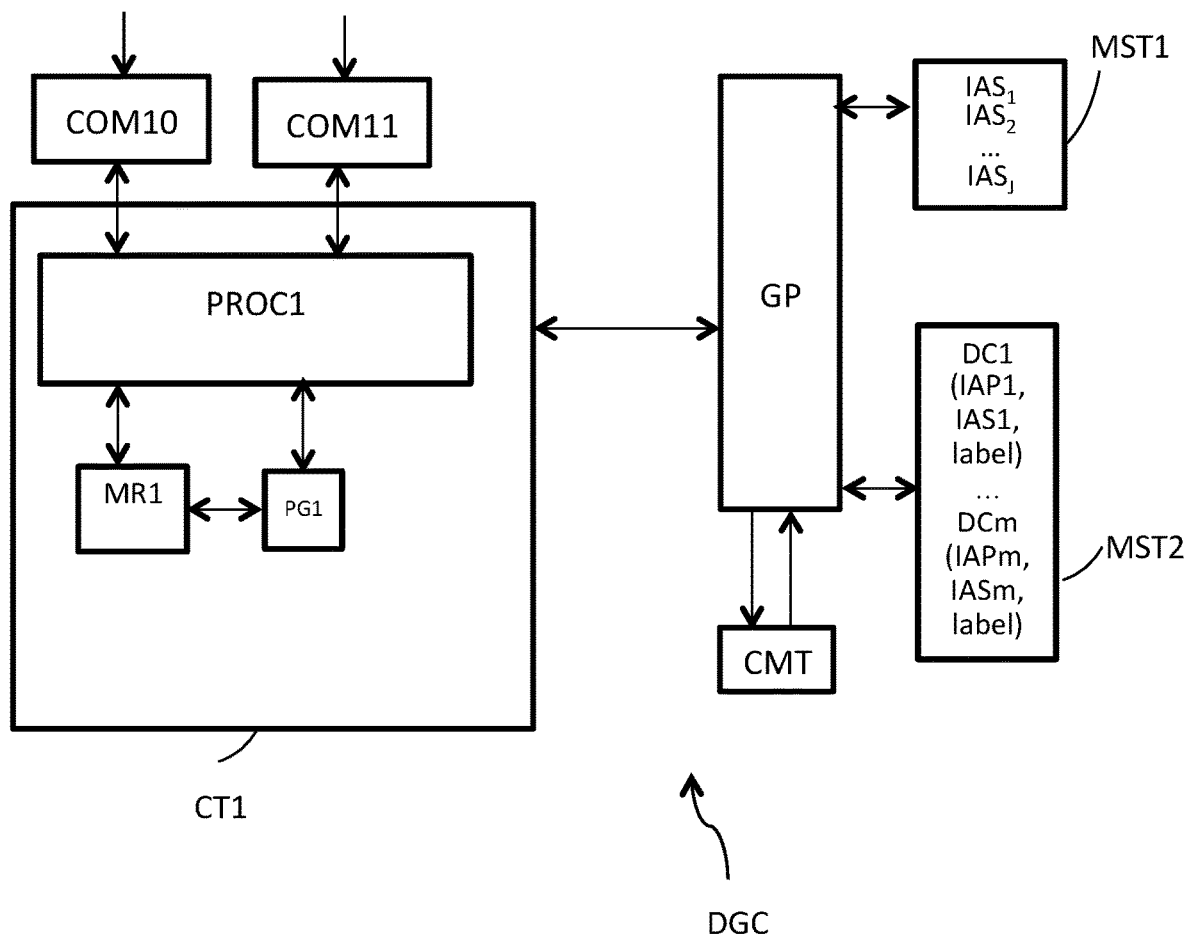
FIG. 2 shows the simplified structure of a communications management device belonging to the system of FIG. 1, according to one embodiment.

Referring to FIG. 2, we now consider the simplified structure of the communications management platform DGC according to one example of an embodiment of the invention. Such a platform is adapted to implementing the method for managing a communication call between a caller terminal and a called terminal according to one embodiment of the invention which will be described here below.

For example, the communications management platform DGC comprises physical and/or software resources, especially a processing circuit CT1 to implement the communications management method according to one embodiment of the invention, the processing circuit CT1 comprising a processor PROC1 managed by the computer program PG1.

At initialization, the code instructions of the computer program PG1 are for example loaded into a RAM denoted as MR1 and then executed by the processing circuit CT1.

The communications management platform DGC comprises chiefly:

a communications interface COM10 adapted to exchanging messages with the communications device DC1 of FIG. 1, via the network RC1 or else another network not shown in FIG. 1, said messages being compliant for example with the http protocol (HyperText Transfer Protocol);

a communications interface COM11 capable of communicating with the communications devices DC1 and DC2 and which, depending on the type of communication call to be set up, can be a communications interface capable of sending out or receiving voice calls or else a communications interface capable of sending or receiving SMS (Short Message Service) type text messages or else again a communications interface capable of sending out and receiving MMS (Multimedia Messaging Service) type multimedia messages;

profile manager GP capable of managing the profile of the user UT1 of the communications device DC1;

a first storage module MST1, for example a database, connected to the profile manager GP and containing a plurality of secondary call identifiers $IAS_1$, $IAS_2$, ..., $IAS_m$, ..., $IAS_J$ where J is an integer greater than or equal to 1 and $1 \leq m \leq J$, a second storage module MST2, for example a database, connected to the profile manager GP and containing identification information of the communications devices DCi, this information having been communicated, in a preliminary exchange between the user UTi of the communications device DCi and the platform DGC, to this platform and then recorded in the second storage module MST2 in association with one of the secondary call identifiers stored in the first storage module MST1, for example the secondary call identifier $IAS_m$.

Taking the example of the communications device DC1, such pieces of identification information comprise, on the one hand, the main call identifier IAP1 of the communications device DC1 (for example the MSISDN identifier of the communications device DC1, the landline number of the user UT1 of the communications device DC1, the IP address or else the permanent email address of the user UT1), and on the other hand one or more pieces of identification information (labels) that the user UT1 wishes to associate with a secondary identifier (for example a hypertext link towards his company's internet site, a logo, a name, a title etc.). Such a management of profiles by the DGC platform enables a caller user to choose the "label" that will be displayed on the screen of the called terminal, if it is not yet known to this terminal.

The second storage module MST2 contains such pieces of information for all the communications devices DCi that have subscribed, at the platform DGC, to the service for allocating secondary call identifiers.

The communications interfaces COM10, COM11, as well as the profile manager GP are managed by the processor PROC1 of the processing circuit CT1.

According to one embodiment, the secondary call identifiers $IAS_1$, $IAS_2$, ..., $IAS_m$, ..., $IAS_J$ mentioned here above are part of a pool assigned by the administrator of the platform DGC to a partner service provider with which the user UT1 of the communications device DC1 has registered beforehand. In other words, this pool of secondary call identifiers is reserved for the service to which the user UT1 has subscribed.

A secondary call identifier selected in the pool of secondary call identifiers $IAS_1$, $IAS_2$, ..., $IAS_m$, ..., $IAS_J$, for example the identifier $IAS_m$, is associated with the pieces of identification information of the communications device DC1 which are stored in the storage module MST2. In the example shown, the selected secondary call identifier, $IAS_m$ is a telephone number. However, as a variant and depending on the context of the communication call to be set up, the secondary call identifier can be an alias, a pseudonym or a MSISDN type network identity, an IP address, an email address, an E.164 address, an SIP address. In addition, this secondary call identifier can be recorded in association with an identifier IDS of the service to which the user UT1 of the first communications device DC1 has subscribed. To this end, this secondary identifier has a duration of validity that corresponds for example to the duration of subscription to this service or else a pre-determined duration, fixed beforehand by the administrator of the communications management platform DGC.

The profile manager GP is connected to a switching center CMT that is capable of processing the communications path set up from the communications device DC1 to the communications device DC2, as shown in FIG. 1. The exchanges between the communication center CMT and the profile manager GP are for example compliant with the SIP (Session Initiation Protocol).

The switching exchange CMT is well known per se. In the example shown, it corresponds for example to a mobile switching center (MSC) of a mobile telecommunications network. According to another embodiment in which the communications device DC1 is of a fixed type, the switching exchange CMT could be a local exchange of a landline telecommunications network. It can be noted that in the landline telecommunications network, the local exchange processes local calls between the subscribers of a same exchange as well as the departure and arrival of traffic with other exchanges.

The exchange center CMT is characterized by two main functions.

The first main function is a call control function that corresponds to the central function of a telephone exchange. Such a function implements different operations such as the decoding of information on addresses and routing of telephone calls from a first caller communications device to a second called communications device. Such a function is associated with certain call functions such as:
- putting the call on hold;
- transferring calls to a voice message box when the called communications device is not picked up;
- a particular sound informing the caller that his correspondent is already busy or cannot be contacted.

This first function also processes the signaling level set up during the communication call between the two communications devices, i.e. the level corresponding to the signaling of the messages exchanged through the different entities of the communications network.

The second main function is a "Media" function to process the entire media part of communications between the two communications devices. Such a function corresponds to the "Media" level for processing textual data and/or audio data and/or images/videos exchanged between the two communications devices during the communication call.

It must be noted that even if, in the embodiment shown in FIG. 2, the profile manager GP and the switching exchange CMT are hosted together on the communications management platform DGC, this example is in no way exhaustive.

Indeed, in one alternative embodiment, the communications management platform DGC could contain only the profile manager GP, the switching exchange CMT being hosted at another place in the network but always being connected functionally to the profile manager GP.

Figure 3:
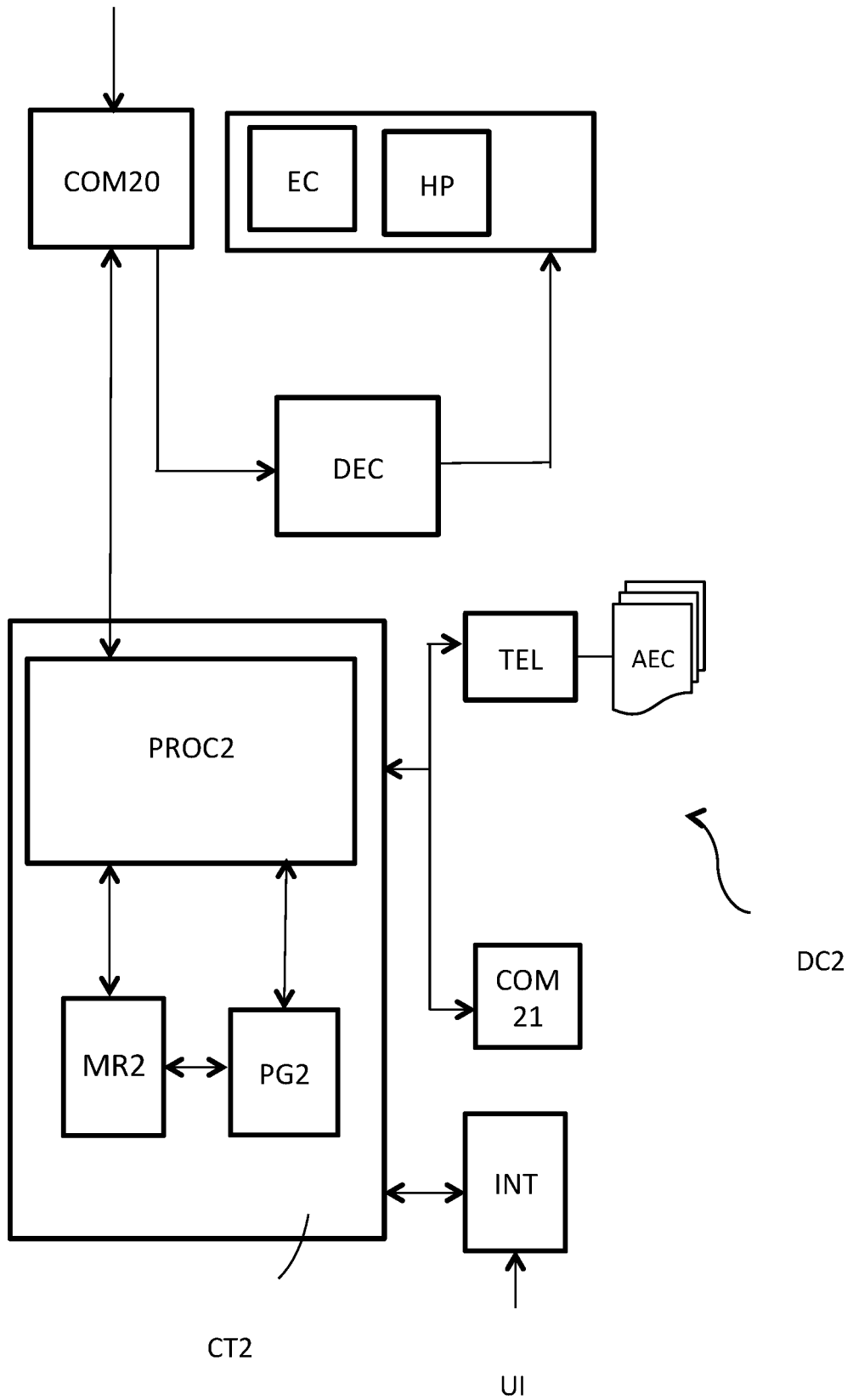
FIG. 3 illustrates the simplified structure of a called communications terminal belonging to the system of FIG. 1, according to one embodiment.

Referring to FIG. 3, we now consider the simplified structure of the communications device DC1 or DC2 according to one exemplary embodiment of the invention.

For example, the communications device DC2, in this case a mobile telephone, comprises physical and/or software resources, especially a processing circuit CT2 to implement the exchanges with the communications management platform DGC of FIGS. 1 and 2 prior to the communication call to be set up, and then once said communication call is set up.

The processing circuit CT2 contains a processor PROC2 driven by a computer program PG2.

At initialization, the code instructions of the computer program PG2 are for example loaded into a RAM denoted as MR2 and then executed by the processing circuit CT2.

The communication device DC2 comprises mainly:
- a communications interface COM20 adapted to exchanging messages with the profile manager GP of the communications management platform DGC of FIGS. 1 and 2, via the communications network RC2 or another data communications network that is not shown, said messages being compliant for example with the http (Hyper Text Transfer Protocol);
- a communications interface COM21 capable of setting up/receiving a call via the communications network and which, depending on the type of communication to be established, can be a communications interface capable of sending or receiving voice calls or else a communications interface capable of sending or receiving SMS type text messages or yet again a communications interface capable of sending or receiving MMS type multimedia messages.

The communications device DC2 also comprises:
- a module INT for processing user interactions UI;
- a viewing screen EC;
- a speaker HP;
- an interface DEC for the audio/video decoding of the text, audio, video or audiovisual type contents, said interface being adapted to transmitting the signals decoded on the screen EC or in the speaker HP;
- a module TEL for downloading text and/or audio and/or audiovisual type contents or yet other applications.

More particularly, the communications COM20 is configured so that, prior to setting up the communication call with the caller communications device DC1, it can receive a message from the communications management platform DGC and via the communications interface COM10 of this platform, the message comprising the pieces of identification information associated with a communications device DC1 that have been pre-recorded, as explained further above, in the storage module MST2 of the communications management platform DGC, namely:
- the main call identifier IAP1 of the caller communications device DC1;
- the secondary call identifier IAS1 of the communications device DC1 used to initiate the communication call towards the communication terminal called DC2;
- identification information on the user UT1 of the caller communications terminal DC1 that this terminal has previously communicated to the communications management platform DGC so that this information is associated by this platform with its secondary call identifier IAS1.

Such a notification can also include instructions for management of the address book of the communications management device DC2 in the form of CRUD (Create, Read, Update, Delete) operations to enable the updating of an existing contact associated with the user UT1 (for example to add a new secondary call identifier in an existing contact known from a main call identifier).

Optionally, the communications terminal DC2 wishes to subscribe, like the terminal DC1, to a service for allocating one or more secondary call identifiers. The downloading module TEL of the communications device DC2 is furthermore configured for the downloading, from the communications management platform DGC, of an application AEC dedicated to the management of communication calls in compliance with one embodiment of the present invention.

Such an application has the function especially of enabling the user UT2 of the communications terminal DC2 to get connected to the communications management platform DGC for the configuration therein of its secondary call identifiers, and the identification information (label) that it wishes to associate therewith. This information is transmitted to the profile manager GP and recorded in association in the storage module MST2, as described here above.

It also has the function, when the user UT2 wishes to initiate a communication call using one of his secondary call identifiers IAS2, to send a request for setting up a communication call to the communications management platform DGC.

The communications interfaces COM20, COM21, the downloading module TEL, as well as the user interaction processing module INT are driven by the processor PROC2 of the processing circuit CT2.

Referring to FIG. 4, we now describe the progress of a method for managing a communication call according to one embodiment of the invention, as implemented in the communications management platform DGC on the one hand and in the called communications terminal DC2 on the other.

Prior to the execution of this method, it is considered that:
- the application AEC for setting up a communication call from a secondary call identifier has been preliminarily downloaded by the downloading module TEL of the communications device DC1;
- the platform DGC has allocated one or more secondary call identifiers to the communications device DC1, chosen from among the pool of secondary call identifiers $IAS_1, IAS_2, \ldots, IAS_m, \ldots, IAS_j$ available at the time of the request by the user UT1. The selected secondary call identifier is for example the identifier IAS1;

the user UT1 of the communications device DC1 has communicated, to the communications management platform DGC, the identification information that he wishes to associate with the secondary call identifier IAS1 of his communications device DC1;

the platform DGC has recorded, in association, in the module MST2 of the profile manager GP, the main call identifier IAP1 of the communications device DC1, its secondary call identifier IAS1 and the associated identification information (label) (or, as a variant, several secondary call identifiers with the different pieces of identification information to be associated with each of them).

In general, the method for managing a communication call according to the invention is implemented when the user UT1 of the communications device DC1 wishes to initiate a communication call using the secondary call identifier IAS1 of this device DC1 addressed to the communications device DC2 of FIG. 1.

To this end, at a step ST1 represented in FIG. 4, the profile manager GP of the communications management platform DGC receives a message ReqCom (IAS1, IAP2) from the communications device DC1 via the communications interface COM10 of this device DC1, for example according to the http protocol. The message contains:

a request for setting up a communication call towards the terminal DC2, identified for example by its main call identifier IAP2;

the main call identifier IAS1 of the communications device DC1, which the user UT1 has selected to initiate this communication call.

Upon reception of this request, the platform DGC verifies that the user UT1 is authenticated by comparing the identification information contained in the received message with the information recorded in the storage module MST2 of FIG. 2, and from this module MST2 it extracts the main call identifier IAP1 and the identification information (label) associated with the secondary call identifier IAS1 for this communications terminal DC1.

At a step ST2, the platform DGC sends the called communications terminal DC2 a notification Notif(IAP1, IAS1, label, CRUD, cont_data) which contains for example:

the main call identifier IAP1 of the caller terminal DC1, for example MSISDN;

the secondary call identifier IAS1, for example a secondary telephone number, with which the user UT1 wishes to set up the communication call;

label identification information that the user UT1 has communicated beforehand to the platform DGC so that this information is associated with the secondary call identifier IAS1, for example the logo of his firm, or hypertext link pointing to this company's internet site;

CRUD operations giving instructions, if necessary, to update a contact recorded in the address book of the terminal of DC2 for the user UT1, in associating with the corresponding updates=d data cont_data.

Such a notification Notif(IAP1, IAS1, label, CRUD, cont_data) can have a JSON (JavaScript Object Notation) type structure which is a format of text data used to represent structured information, for example:

{MSISDN: +33631258565, IAS1: +33715458796, label: Mon Entreprise, create, {IAS1: +33715458796}}

{MSISDN: +33631258565, IAS1: +33715458796, label: Mon Entreprise, update, {cont_data: Mon Entreprise}}

The first example here above corresponds to the case of a notification with a new secondary telephone number, used to set up a communication call. As shall be seen in greater detail here below, if the main telephone number MSISDN of the user UT1 is already recorded in the address book of the called terminal DC2, the operations "create {IAS1: +33715458796} make it possible to record this secondary telephone number IAS1 in the contact associated with UT1.

The second example here above corresponds, in a professional call context for example, to an updating of the name of the company associated with UT1.

Referring again to FIG. 4, the called communications terminal DC2, upon reception of the notification sent out by the communications management platform DGC, verifies Verif(IAP1) the presence of the main call identifier IAP1 of the caller terminal DC1 in its address book, during a step referenced ST3. Such an address book is for example recorded in the memory MR2 of the processing circuit CT2 and lists all the contacts known to the user UT2. This verification consists for example in verifying the presence of the MSISDN of the caller terminal DC1 in the address book.

At the end of this verification, the communications terminal DC2 sends out an acknowledgment of reception ACK to the communications management platform DGC during a step referenced ST4.

In addition if, during the verification step ST3, the terminal DC2 has identified the main call identifier IAP1 as having been already recorded in its address book, it then updates the corresponding contact associated with the user UT1 during a step ST3B CRUD(IAP1) on the basis of the CRUD instructions contained in the notification received during the step ST2, and the corresponding contact data cont_data. For example, it adds the new secondary telephone number IAS1 to the contact associated with the user UT1.

During a step referenced ST5, the communications management platform DGC then, through the exchange center CMT, routes the incoming communication call ReqCom (IAS1, IAP2) initiated by the caller terminal DC1 to the called terminal DC2.

Two situations can then occur when the called communications terminal DC2 receives this incoming call:

If, at the verification step ST3, the terminal DC2 has identified the main call identifier IAP1 as being already recorded in its address book then, at a step ST6Aff_EC, it displays the contact information recorded in association with this MSISDN in the address book (for example a name/forename of the user UT1) (possibly after updating these pieces of information during the step ST3B);

If, on the contrary, during the verification step ST3, it has been concluded that this MSISDN was unknown to the called terminal DC2, then this terminal displays, on the screen EC and at a step ST6Aff_EC, the identification information label contained in the notification Notif (IAP1, IAS1, label, CRUD, cont_data) received at the step ST2.

In either case, the user UT2 therefore has information available on the identity of the user UT1 who is trying to contact him and this is the case even if he does not know the secondary telephone number used by the latter. He can then take an informed decision as to whether to accept or reject this incoming communication call.

As regards these pieces of identification information (label) it will be noted that several cases of use can arise:

In a professional context, they can enable the user UT1 to inform the user UT2 that he represents the company, My Company, even if he is not part of the list of contacts of the called terminal DC2;

in a private context, they can enable the user UT1 to use different telephone numbers for different contact groups, for example his family circle, the social networks, and his group of friends;

finally, they can enable the user UT1 to have two profiles, a professional profile associated with certain call identifiers and a private profile associated with certain other call identifiers, and can enable him to switch from one of these profiles to the other while keeping the same communications terminal DC1.

At the end of the call, end-of-communication messages FIN are transmitted by the called terminal DC2 to the communications management platform DGC during a step ST7, and then by the communications management platform DGC to the caller terminal DC1 at a step ST8.

At a step referenced ST9, if the main call identifier IAP1 of the caller terminal DC1 is not known to the address book of the called terminal DC2, this terminal can then make a display, in the form of a pop-up message on the screen EC, of a proposal Add_Contact? for recording this new contact UT1 in the address book.

Thus, during a following call if any, even if it is initiated with another secondary call identifier of the terminal DC1, the user UT2 recognizes the person who is seeking to contact him.

This is particularly useful in the context of an anti-spam combat by the called terminal DC2. Indeed, the method of management of the invention advantageously makes it possible to propagate known anti-spam mechanisms and call-blocking procedures to secondary call identifiers, as illustrated in FIG. 5.

In this figure, for the sake of simplicity, the steps identical to those of FIG. 4 are designated by the same references and shall not be described in greater detail. If necessary, references could be made to the description of FIG. 4 here above.

According to the communications management method of FIG. 4, the called terminal DC2, during a step ST3, verifies the existence of the main call identifier IAP1 of the caller terminal DC1 in its address books.

The information provided in the notification received at the step ST2 enables it indeed to establish a correspondence between the main call identifier IAP1, for example MSISDN, and the secondary call identifier IAS1 used by the caller terminal DC1.

Through this correlation, if the main caller identifier has previously been identified as a source of spam or has previously been blocked by the user UT2, it is possible to block also the secondary caller identifier IAS1, or to mark it as an undesirable number.

Thus, in a step referenced ST10 Verif_SPAM, the terminal DC2 automatically verifies the presence of the main call identifier IAP1 or the secondary call identifier IAS1 in a list of call identifiers deemed to be undesirable.

If for example the main telephone number IAP1 has been previously identified as being undesirable and recorded as such in the terminal DC2, this terminal, in a step referenced ST11 Update_Spam, updates the list of undesirable call identifiers by adding the secondary call identifier IAS1 to this list.

Upon reception ST5 of the incoming communication calls ReqCom(IAS1, IAP2), the terminal DC2 can automatically carry out its rejection RejCom(IAS1, IAP2) during a step referenced ST12. This rejection is propagated from the communications management platform DGC to the caller terminal DC1 during a step referenced ST13.

This solution does not require any manual intervention on the part of the user UT2 to block a secondary call identifier if he has already identified the fact that the main call identifier or another identical secondary call identifier of the same caller terminal is undesirable. This is therefore a particularly efficient solution for combating spam should the caller terminal regularly change his or her secondary telephone numbers.

More generally, the solution of the invention preserves numerous advantages, from the viewpoint of both the caller terminal and the called terminal.

From the viewpoint of the caller terminal:
the user UT1 can choose precisely the label that he wishes to display on the screen of the called terminal when he initiates the communication call from the secondary telephone number;

whichever the secondary telephone number used to initiate the call, the users of the called mobile terminals can identify the caller user UT1, whether they know it or not;

the user UT1 does not need to inform his friends, family or professional contacts beforehand that he has a secondary telephone number;

the "labels" associated with the caller's secondary telephone numbers are managed homogenously and uniformly for all called terminals, which sees them as being displayed in the same form.

From the viewpoint of the called terminal:
if the caller terminal is already part of the contacts of the address book, the user UT2 does not need to carry out steps for recording his different secondary telephone numbers; this is done automatically and transparently;

the called terminal does not need to manage the identification information associated with the secondary telephone numbers nor does it need to have a reverse directory at its disposal;

the called user UT2 does not need to record a new unknown number in his address book, in order that it can be displayed at a subsequent call. This is done automatically by the display of a pop-up message proposing this automatic addition at the end of the received call It goes without saying that the embodiments that have been described here above have been given purely by way of an indication and are in no way exhaustive, and that many modifications can easily be made by those skilled in the art without in any way departing from the framework of the invention.

The invention claimed is:

1. A method comprising:
managing, by a communications management device, communication calls between a caller communications terminal and a called communications terminal, the caller communications terminal having a main call identifier and at least one secondary call identifier, which is recorded in association with said main call identifier in the communications management device, the main call identifier and the secondary call identifier being call identifiers from which the caller communications terminal can set up the communication calls, and wherein the managing comprises, in response to said caller communications terminal initiating a communication call addressed to said called communications terminal from said at least one secondary call identifier:

sending, to said called terminal, a notification comprising at least said main call identifier, said at least one secondary call identifier and at least one piece of identification information of a user of said caller terminal associated with said secondary call identifier; and after sending the notification, routing said communication call to said called terminal using said at least one secondary call identifier.

2. The method according to claim 1, wherein said notification also comprises an instruction on management of a contact associated with said user of said caller terminal, said management instruction belonging to the group consisting of:

a creation instruction;
a reading instruction;
an update instruction;
a delete instruction.

3. A non-transitory computer-readable recording carrier, on which there is recorded a computer program comprising program code instructions for execution of a method of managing, by a communications management device, communication calls between a caller communications terminal and a called communications terminal, when said program is executed by a processor of the communications management device, wherein the instructions configure the communications management device to:

record, in association, a main call identifier and at least one secondary call identifier of said caller communications terminal, the main call identifier and the secondary call identifier being call identifiers from which the caller communications terminal can set up the communication calls;

receive a communication call initiated by said caller communications terminal from said at least one secondary call identifier, addressed to said called communications terminal;

send, to said called terminal, a notification comprising at least said main call identifier, said at least one secondary call identifier and at least one piece of identification information of a user of said caller terminal associated with said secondary call identifier; and after sending the notification, route said communication call to said called terminal using said at least one secondary call identifier.

4. A communications management device for setting up communication calls between a caller communications terminal and a called communications terminal, the communications management device comprising:

a processing circuit that is configured to:

record, in association, a main call identifier and at least one secondary call identifier of said caller communications terminal, the main call identifier and the secondary call identifier being call identifiers from which the caller communications terminal can set up the communication calls;

receive a communication call initiated by said caller communications terminal from said at least one secondary call identifier, addressed to said called communications terminal;

send a notification to said called terminal, comprising at least said main call identifier, said at least one secondary call identifier and at least one piece of identification information of a user of said caller terminal associated with said secondary call identifier; and after sending the notification, route the communication call to the called terminal using the secondary call identifier.

5. A method for managing by a called communications terminal an incoming communication call, said incoming communication call being initiated by a caller communications terminal having a main call identifier and at least one secondary call identifier, which is recorded in association with said main call identifier, in at least one communications management device, the main call identifier and the secondary call identifier being call identifiers from which the caller communications terminal can set up the communication call, and, wherein the method comprises the following acts performed by the called communications terminal:

in response to said incoming communication call being initiated from said at least one secondary call identifier:

receiving a notification comprising at least said main call identifier, said at least one secondary call identifier and at least one piece of identification information of a user of said caller terminal associated with said secondary call identifier;

verifying presence of at least said main call identifier in an address book of said called communications terminal;

upon reception of said incoming communication call:

in the event of the presence of said main call identifier, displaying a user identifier stored in said address book, in association with said present call identifier; and in the event of absence of said main call identifier in said address book, displaying said at least one identification information comprised in said received notification.

6. The method for managing an incoming communication call according to claim 5, further comprising, in the event of the presence of said main call identifier in said address book, the called communications terminal updating, in said address book, a contact associated with a user of said caller terminal, by addition of said at least one secondary call identifier and/or of said piece of identification information comprised in said notification received.

7. The method for managing an incoming communication call according to claim 5, further comprising the called communications terminal, in the event of absence of said main call identifier in the address book, at an end of said incoming communication call, displaying a message proposing recording said at least one piece of identification information, in association with said at least one secondary call identifier and/or said main call identifier, in said address book.

8. The method for managing an incoming communication call according to claim 5, further comprising the called communications terminal verifying that said main call identifier is a blocked call identifier and, if the answer is affirmative, rejecting said incoming communication call initiated from said at least one secondary call identifier.

9. A non-transitory computer-readable recording carrier, on which there is recorded a computer program comprising program code instructions for execution of a method of managing an incoming communication call, when said program is executed by a processor of a called communications terminal, said incoming communication call being initiated by a caller communications terminal having a main call identifier and at least one secondary call identifier, which is recorded in association with said main call identifier, in at least one communications management device, the main call identifier and the secondary call identifier being call identifiers from which the caller communications terminal can set up the communication call, and wherein the method comprises the following acts performed by the called communications terminal:

in response to said incoming communication call being initiated from said at least one secondary call identifier:
   receiving a notification comprising at least said main call identifier, said at least one secondary call identifier and at least one piece of identification information of a user of said caller terminal associated with said secondary call identifier;
   verifying presence of at least said main call identifier in an address book of said called communications terminal;

upon reception of said incoming communication call:
   in the event of the presence of said main call identifier, displaying a user identifier stored in said address book, in association with said present call identifier; and
   in the event of absence of said main call identifier in said address book, displaying said at least one identification information comprised in said received notification.

10. A communications terminal comprising:

a processing circuit configured to:

process an incoming communication call initiated by the caller communications terminal, having a main call identifier and at least one secondary call identifier, which is recorded in association with said main call identifier in at least one communications management device, the main call identifier and the secondary call identifier being call identifiers from which the caller communications terminal can set up the communication call, comprising:

in response to said incoming communication call being initiated from said at least one secondary call identifier:

receiving a notification comprising at least said main call identifier, said at least one secondary call identifier and at least one piece of identification information of a user of said caller terminal associated with said secondary call identifier;

performing a verification on presence of at least one of said main call identifier, in an address book of said called communications terminal; and upon reception of said incoming communication call:
   in the event of a presence of said main call identifier in said address book, displaying a user identifier stored in said address book in association with said present call identifier; and
   in the event of an absence of said main call identifier in said address book, displaying said identification information comprised in the notification received.

* * * * *